(12) United States Patent
Maurer

(10) Patent No.: US 11,687,754 B1
(45) Date of Patent: Jun. 27, 2023

(54) AUTOMATED LOCATION CAPTURE SYSTEM

(71) Applicant: Michael G. Maurer, Galloway, NJ (US)

(72) Inventor: Michael G. Maurer, Galloway, NJ (US)

( * ) Notice: Subject to any disclaimer, the term of this patent is extended or adjusted under 35 U.S.C. 154(b) by 0 days.

(21) Appl. No.: 17/369,675

(22) Filed: Jul. 7, 2021

Related U.S. Application Data

(63) Continuation-in-part of application No. 15/874,473, filed on Jan. 18, 2018, now Pat. No. 10,117,063.

(51) Int. Cl.
   *G06K 19/07* (2006.01)
   *G06K 7/10* (2006.01)
   *G06V 20/00* (2022.01)

(52) U.S. Cl.
   CPC ..... *G06K 19/0723* (2013.01); *G06K 7/10366* (2013.01); *G06V 20/36* (2022.01)

(58) Field of Classification Search
   CPC ................... G01S 5/14; H04W 4/021
   USPC ...................................... 340/686.6
   See application file for complete search history.

(56) References Cited

U.S. PATENT DOCUMENTS

| | | | | |
|---|---|---|---|---|
| 2002/0008621 | A1* | 1/2002 | Barritz | G06Q 10/0875 705/29 |
| 2005/0285793 | A1* | 12/2005 | Sugar | G01S 5/14 342/465 |
| 2007/0205886 | A1* | 9/2007 | Huseth | G01S 5/0231 340/539.15 |
| 2012/0169530 | A1 | 7/2012 | Padmanabhan | |
| 2016/0171777 | A1* | 6/2016 | Todeschini | G06T 19/006 345/633 |
| 2019/0120929 | A1* | 4/2019 | Meadow | G01S 5/0027 |

* cited by examiner

*Primary Examiner* — Fabricio R Murillo Garcia
(74) *Attorney, Agent, or Firm* — Leavitt Eldredge Law Firm

(57) ABSTRACT

A locating system includes a mobile smart device and/or central server to receive and process data; a device to be secured or assigned to a person or asset, the device having an RFID tag with communication technology to receive commands from one or more smart devices, such that location is updated without the need for real-time infrastructure.

3 Claims, 7 Drawing Sheets

AUTOMATED LOCATION CAPTURE SYSTEM

BACKGROUND

1. Field of the Invention

The present invention relates generally to location tracking systems, and more specifically, to an automated tag location capture system without the need for costly real-time locating infrastructure.

2. Description of Related Art

Location tracking systems are well known in the art and are an effective means to determine a location of a person or asset. For example, FIG. 1 depicts a conventional location tracking system 101 having a plurality of people 103a-c and a plurality of tracking tags 105a-c associated therewith. During use, one or more readers 107a-b receive signals from the plurality of tracking tags 105a-c to provide a network 109 having one or more of a server 111, database 113, and computing device 115 with a location of the people and/or assets within a geographical area that contains a tracking infrastructure.

One of the problems commonly associated with system 101 is expense due to the large amount of infrastructure, including various types of readers. For example, many organizations find it cost prohibitive to install the multitude of readers required by system 101 above. Further, these organizations find that the cost outweighs the benefit when they desire to only track minimal equipment or life safety is not considered when tracking persons.

Accordingly, although great strides have been made in the area of tracking systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
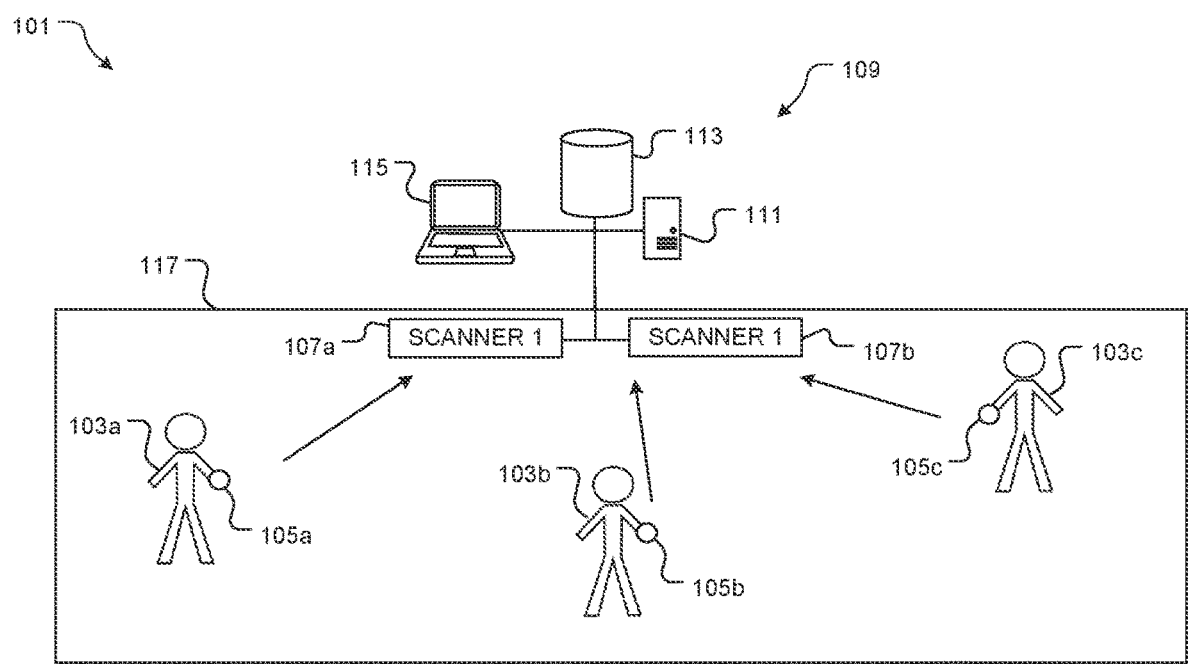
FIG. 1 is a simplified schematic of a common person and apparatus tracking system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional tracking systems. Specifically, the present invention provides a cost-effective tracking system by eliminating most or all of the infrastructure associated with conventional tracking systems. The system of the present invention, in the preferred embodiment, uses Bluetooth technology, however other technologies may be used. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
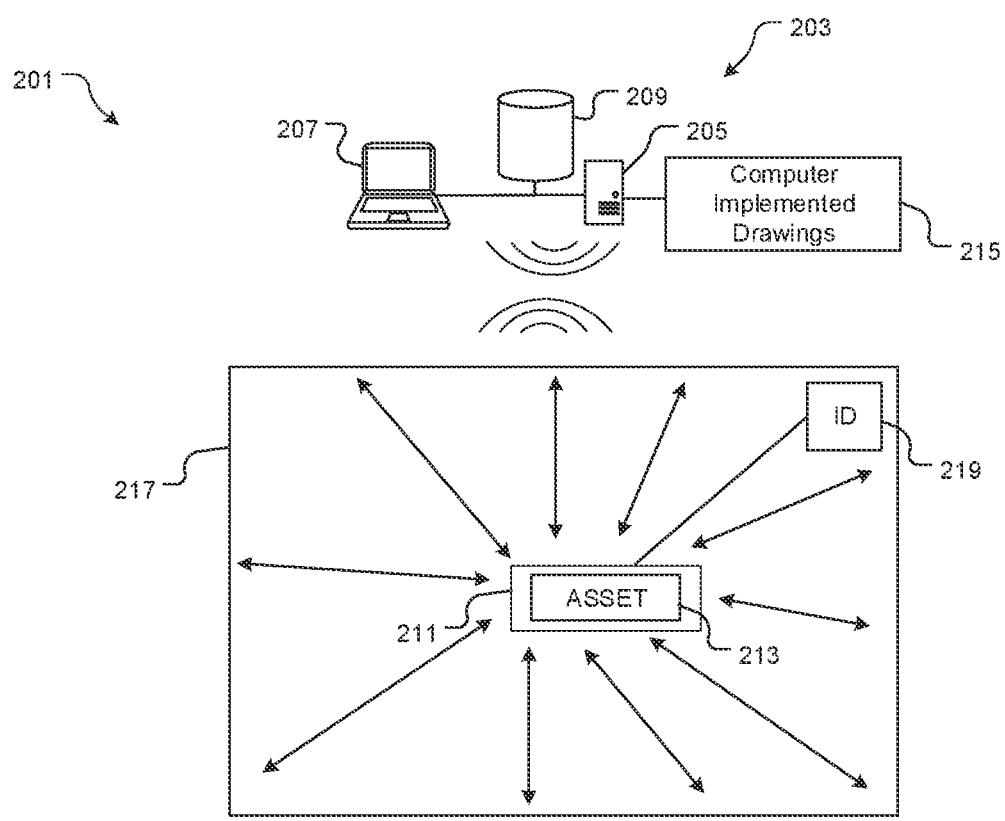
FIG. 2 is a simplified schematic of a real-time tracking system in accordance with a preferred embodiment of the present application.

Referring now to the drawings wherein like reference characters identify corresponding or similar elements throughout the several views, FIG. 2 depicts a simplified schematic of a real-time location tracking system 201 in accordance with a preferred embodiment of the present application. It will be appreciated that system 201 overcomes one or more of the above-listed problems commonly associated with conventional location tracking systems.

In the contemplated embodiment, system 201 includes a network 203 having one or more of a server 205, a computer 207 and a database 209 wherein the network is configured to receive and process data received from one or more tracking devices 211, the one or more tracking devices being associated with and connected to persons or assets 213. It should be appreciated that the various components of the network can vary to perform the same function described herein, specifically, the server can be a cloud based server configured to wirelessly process and transmit data. It should be appreciated that processing can be accomplished by a cloud server or locally on one or more of the physical devices. Further, it must be understood that technological advances can further be incorporated into system 201 to achieve the same function.

It should be understood that the system and method discussed herein as a simplified version, can be expanded to a large number of tracking devices, associated with a large number of persons or assets, and further used on large campuses or within large buildings.

In some embodiments, tracking devices 211 are tags having one or more sensors configured to emit signals and be secured to assets, such as electrical equipment, medical equipment and the like. It is contemplated that the one or more sensors may capture and relay information such as temperature, pressure, and humidity. In alternative embodiments, the tracking devices can be incorporated into mobile computing devices, such as smart phone, wherein the mobile computing devices include sensors configured to emit signals. It should again be understood that system 201 contemplates the use of any tracking devices that are developed in the future, having the same functionality and practicality as discussed herein. It should further be appreciated that the tracking devices 211, can include any known technology to aid in tracking, including GPS technology and cellular communication technology, and further including Bluetooth technology and RFID technology.

It should be appreciated that each tracking device has a unique ID, thereby providing a means to assign each tracking device to a specific person or asset. Further, the unique ID can include pertinent information, such as equipment type, equipment serial number, patient name, medical history, staff name, etc.

In the present invention, a software program 215 is incorporated into network 203 and includes a method to create and/or download computer implemented drawings of one or more buildings, the computer implemented drawings containing detailed data regarding floorplans, structures, and the like of buildings associated with campuses.

Tracking device 211 is configured to emit one or more signals, such as radio frequency signals, ultrasound signals, and/or infrared signals, whereby said signals are configured to detect structures 217 such as wall surfaces, thereby providing raw distance data between the tracking device and surroundings. In FIG. 2, 217 represents a simplified example of a room associated with a building in which tracking is implemented. Further in FIG. 2, the plurality of arrows emanating from tracking device 211 demonstrate the raw distance data as determined in the room.

System 201 further includes one or more unique identifiers 219 associated with entry points of buildings and floors. This feature will be discussed in more detail according to FIG. 3. Unique identifiers 219 provide additional data to be picked up by tracking device 211, this additional data providing information such as floor number and designated building.

During use of system 201, the unique identifier is picked up by tracking device 211 as a start for the tracking of the device's location. Next, the raw distance data is determined, and all data is transmitted to the server to be compared to the floorplan data of the computer implemented drawings. In this manner, the software and server determine a precise location of the tracking device.

Figure 3:
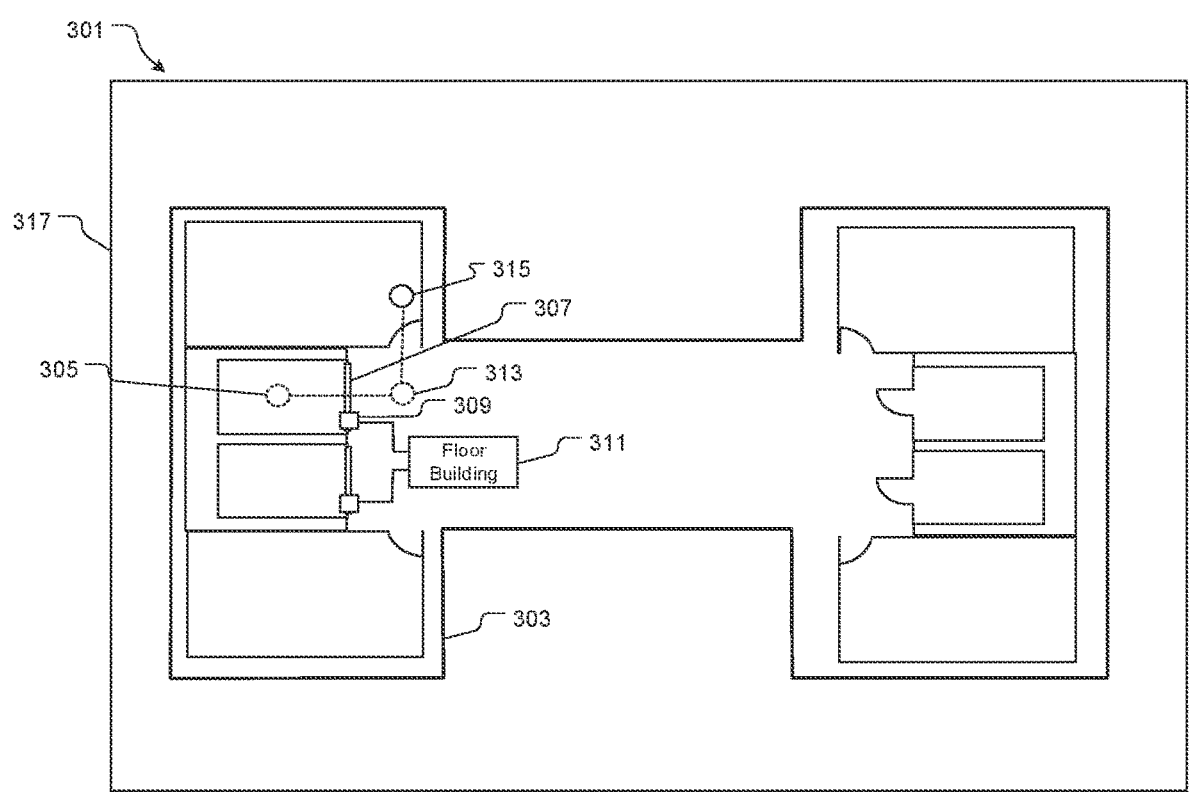
FIG. 3 is a diagram of a building from FIG. 2.

In FIG. 3, a simplified diagram 301 depicts a layout of a building 303 and interaction of the various components. As a tracking device 305 enters a floor, such as through an elevator opening 307, a first unique identifier 309 is read by the tracking device, thereby providing a determination of floor and/or building 311. The tracking device immediately and continuously collects raw distance data to be transmitted to the network/server, thereby allowing for the correlation of the distance data to the floorplan data and providing a first location 313 of the tracking device. As the asset or person moves, and therefore the tracking device moves, distance data is again tracked, and referenced back to the first location, to update to a second location 315. It should be appreciated that this information can be further presented on a display 317 associated with a computing device, wherein a user can visually monitor the location of a person or asset.

Figure 4:
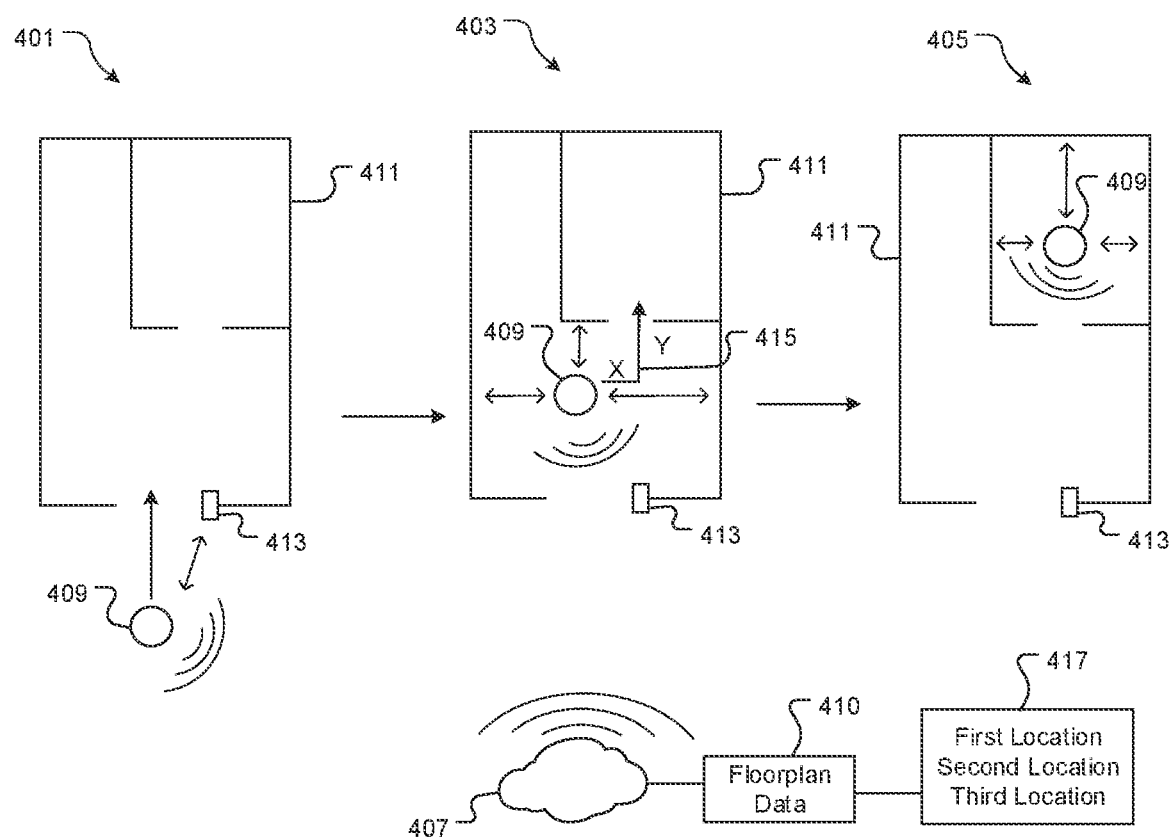
FIG. 4 is a simplified schematic of a plurality of steps associated with the system of FIG. 2.

In FIG. 4, a simplified schematic of a series of steps 401, 403, 405 associated with the method above is further depicted for clarity. In this figure, a cloud based server 407 is shown, being interchangeable with the network and features previously discussed. As shown in step 401, as a tracking device 409 enters a floor/building 411, a unique identifier 413 is read. It should be understood that the unique identifier could communicate via Bluetooth technology, wifi technology, or any other known or future technology with tracking device 409. In addition, the unique identifier may be incorporated into a room number plaque, barcode, holographic code, or any other form of ID. Raw distance data is picked up via tracking device 409 and transmitted to server 407, the raw distance data being based on distances between the tracking device 409 and structures within a room. The one or more sensors are specifically adapted to read the precise distances to walls and structures. It should be appreciated that the system is specifically adapted to discern between existing or moving objects in a room/area based on intelligent object recognition and as built drawings of the area. This technology further allows for the system to determine if there is a change occurring to a floorplan. Living drawings can be updated based on object recognition, as there is a high probability that deviations from prior drawings is a permanent change.

A first location is determined by correlating the raw distance data to floorplan data 410, as shown in step 403, wherein the first location is then used as a reference point for all future moves. As the tracking device 409 is moved to a new location, as shown in step 405, the new raw distance data (as depicted with arrows) is used to determine the X and Y [or latitude/longitude, as some drawings are created geospatially] traveled distance 415 of the tracking device relative to the first location, thereby allowing for an update within the server 407 or local device from a first location to a second location, and so forth 417.

It should be appreciated that one of the unique features believed characteristic of the present application is the limited infrastructure necessary to track a plurality of persons or assets. This feature is achieved by collecting raw distance data from one or more sensors incorporated into a tracking device and correlating said raw data to floorplan data associated with a computer hosted intelligent drawing. In some embodiments, the system uses no infrastructure other than a tag and image/object recognition technology.

Figure 5:
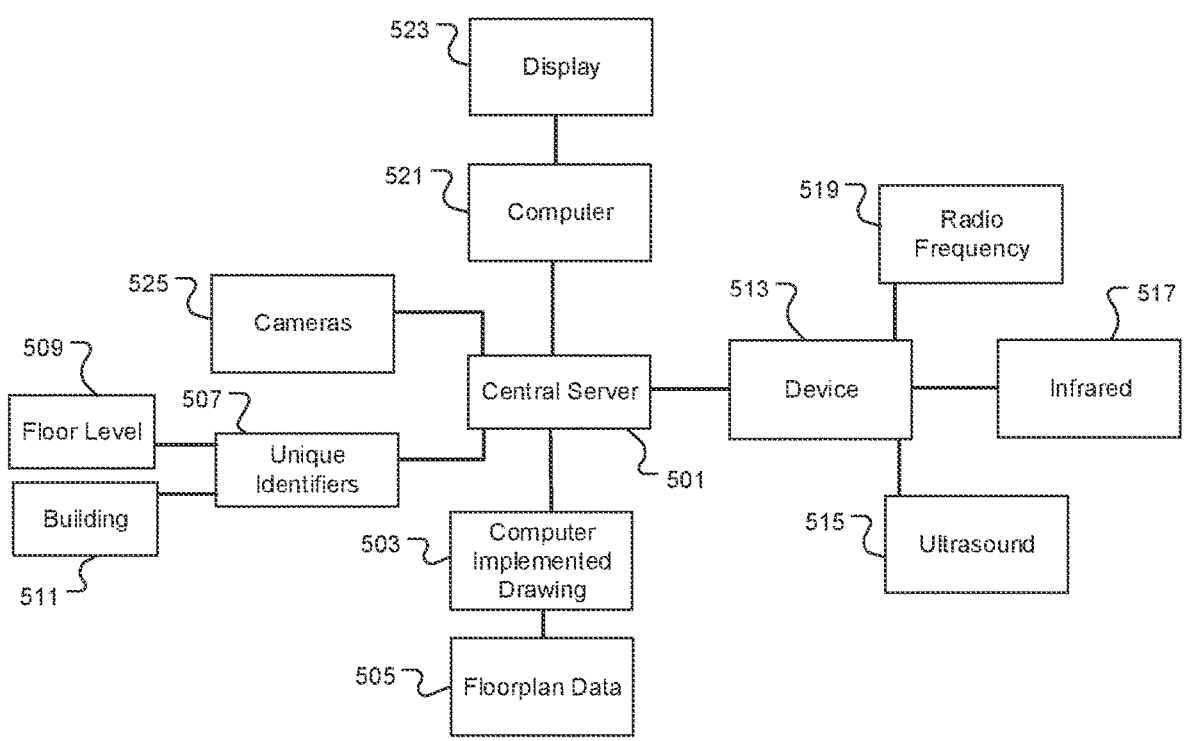
FIG. 5 is a simplified schematic of the features of the system of FIG. 2.

In FIG. 5, a simplified schematic demonstrates the features already discussed herein and additional features contemplated to be incorporated into the present invention. First, a central server 501 is the primary component configured to receive and process data from one or more sources. A computer implemented drawing software 503 is incorporated to provide floorplan data 505 associated with one or more buildings. One or more unique identifiers 507 are installed at portals within the building, specifically at entry points or wherever needed on each floor, thereby providing information including a floor level 509 and building designation 511.

One or more tracking devices 513 having one or more sensors, such as ultrasound sensors 515, infrared sensors 517, radio frequency sensors 519, and any other appropriate sensor, are used to communicate with the unique identifiers and pick up raw distance data from structures within the building and communicate the information to the central server 501.

In some embodiments, one or more computing devices 521 are in communication with the central server 501 to provide a means to receive location data by one or more users and present location data on a display 523. It should be appreciated that the one or more computing devices 521 can be computer, tablets, mobile phones, smart technology devices, and the like as well as any future technology.

In some embodiments, the system of the present invention can further include one or more cameras 525, such as security cameras installed at designated locations within the building. In these embodiments, the one or more cameras can be used to stream video or still images to the sever. The cameras can be further programmed to automatically stream and discontinue streaming based on commands received, the commands signaling the presence of one of the tracking devices within the view of a specified camera. Further, it should be appreciated that one or more cameras could be used for intelligent object and/or facial recognition.

Figure 6:
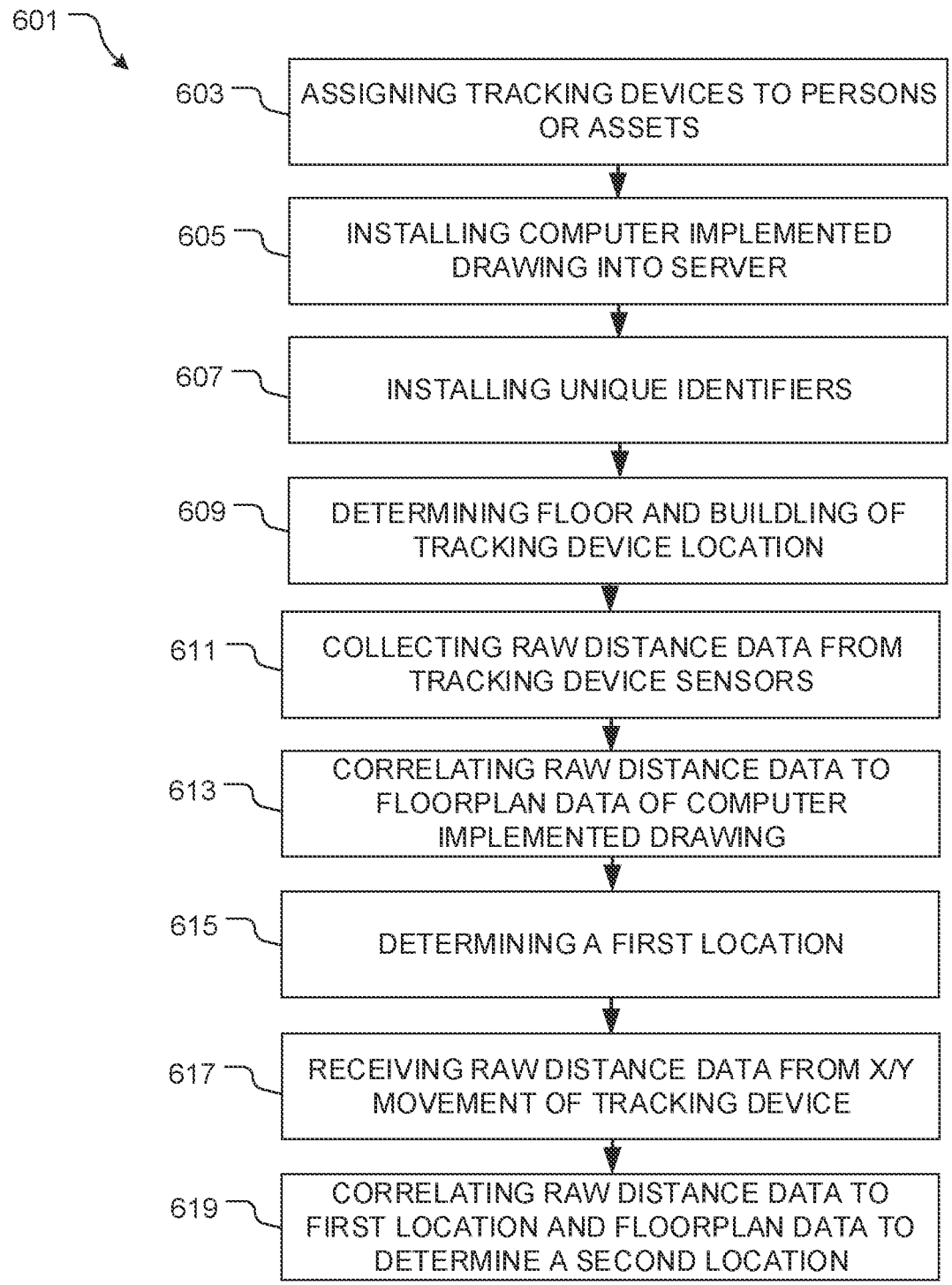
FIG. 6 is a flowchart of the method of use of the system of FIG. 2.

In FIG. 6, a flowchart 601 further depicts the method of use of system 201 discussed above. During use, the plurality of tracking devices are assigned through conventionally known methods to persons or assets, as shown with box 603 (for clarity, a person and/or asset has a unique ID associated with a tracking device that also has a unique ID). The computer implemented drawing software is installed, thereby providing floorplan and site plan data of one or more buildings or an entire campus for outdoor tracking, as shown with box 605. Unique identifiers are installed at entry points of floors and buildings, thereby providing a means to initially determine a floor and/or building where a tracking device is located, as shown with boxes 607, 609. As a tracking device moves, raw distance data is collected via the one or more sensors and transmitted to the central server, wherein the raw distance data is correlated to floorplan data to determine a precise first location of the tracking devices, as shown with boxes 611, 613, 615. As the tracking device continues to move, raw distance data is collected and correlated back to the first location to determine the horizontal and vertical movement of the tracking device, thereby further determining a second location, as shown with boxes 617, 619.

It should be appreciated that the system of the present invention can be programmed to update location determination at predetermined intervals, thereby ensuring that data does not backlog processing of the system. Further, it should be appreciated that during renovations and construction, such information can update intelligent drawings within the server, thereby ensuring the 'living' drawing repository is always current to continuity for accurate tracking.

Figure 7:
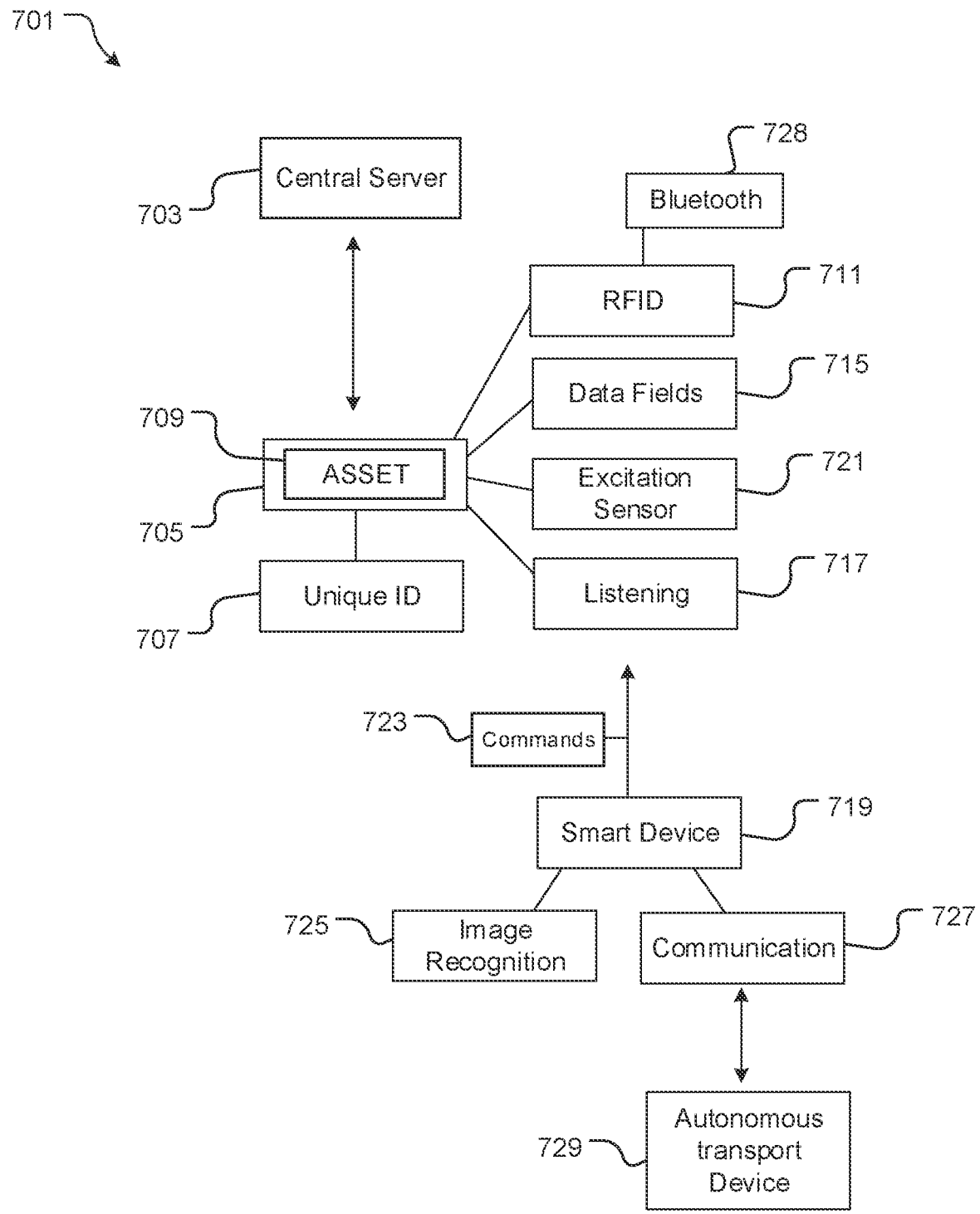
FIG. 7 is a schematic of an alternative embodiment of a location tracking system in accordance with the present application.

In FIG. 7, a schematic of an alternative embodiment of a location tracking system 701 is shown. It should be appreciated that system 701 can include any of the features discussed above. As shown, the system includes a central server 703 configured to receive and process data and a device 705 with a unique ID 707 configured to be secured or assigned to a person or asset 709. The device includes an RFID tag 711 with built in encryption and decryption technology, the RFID tag further having one or more data fields 715 that contain one or more information.

It should be appreciated that the RFID tag may be a BLE tag 728 and use active or passive technology.

In this embodiment, the device will further include a listening technology 717 that continuously listens for instructions from one or more smart devices 719 and an excitation sensor 721 configured to be activated by an external exciter, such as through excitation frequency. It should be appreciated that the smart device may utilize a platform or application as needed to initiate commands.

The one or more smart devices are configured to send one or more commands 723 to the device 705 via the listening technology or customized Bluetooth air protocol. The listening technology of the device will have a code within that recognizes that the smart device included its unique ID in the message to understand that the smart device is talking to it specifically. Once the smart device recognizes the unique ID of the tag it is trying to locate, it will transmit that unique ID, as well as additional commands, to that specific tag and no other tags. The commands can include, among others, a first command to send its unique ID, a second command to store a location as XY or in separate data fields on the tag, specifically, site, building, floor, space name, and space number, a third command to transmit its XY location, a forth command to send its battery status, a fifth command to pass environmental data from the sensors attached to it, a sixth command to send a status or position of an attached digital switch of the device, and a seventh command to execute an audible or visible alert. Alternatively, each of the above or additional commands may be encoded in a single word defined by the air protocol. The smart device will operate using an app to transmit encrypted instructions/commands at designated intervals, such as every couple of seconds, to force all nearby RFID tags (e.g. BLE, active, passive, etc.) communicating via its unique protocol to transmit the data that is stored in its memory (e.g. tag's unique ID, location, battery status, environmental data, etc. The smart devices will send commands to specific unique IDs to force the device with the ID to activate an onboard function, such as blinking a built in LED, and/or sound a built-in annunciator/horn.

The one or more smart devices further include image recognition technology 725 to recognize one or more location identifiers to determine a location of the one or more smart devices; and communication technology 727 to communicate with one or more autonomous transport devices 729 to determine location data. In the preferred embodiment, the communication technology uses internal 2-way communication. The one or more smart devices will use the image recognition technology to recognize room names and numbers to know its location in real time and to associate and store its location along with locations of all tags that transmit their unique IDs and store data as commanded to do so. The one or more smart devices communicate with autonomous transport device, such as an autonomous robot, on which the one or more smart devices may be mounted to know its location in real time, thereby being able to associate and store its location along with locations of all tags that transmit their unique IDs and stored data as commanded to do so.

Given that a smart device knows its location, and can associate the known location with nearby tags, there is no need to send that information to the autonomous transport device 729. Typically, the autonomous transport device (ATD) will move to the middle of a room, save the XY coordinates, and then later the autonomous device can retrieve those XY coordinates to return to the location as needed. When one or more smart devices are traveling down a corridor, whether mounted to the ATD or carried by staff, the App will be running to hear nearby tags and use the image recognition to associate room numbers with the tags that it hears in passing.

The system may utilize an autonomous transport device 729 which will be capable of storing a finite origin reference point on a site, building, room, etc. The device 729 will be able to know where it has moved in X and Y from the origin and has the ability to store and associate specific XY coordinates with room names and numbers so that it has the ability to return to those rooms on command. Further, the device 729 could use its own built in antenna or antenna on the one or more smart devices to determine tag locations on either side of a corridor based on radio frequency signal strength. Yet further, image recognition technology can be used to identify building and floor that the device 729 is traveling to and can link to as built drawings as discussed above to determine how far it has traveled from the origin in XY. This can then be used to identify the nearest room by using MGM's Intelligent Boundary Recognition (IBR), it could associate its XY coordinate location with the closest XY coordinate in the corresponding floor plan CAD drawing file (e.g. AutoCAD, etc.) then, read the attributes (room name or number) in the CAD file attached to the room or space boundaries to associate which room a tag or tags are located.

It should be appreciated and understood that the autonomous transport device 729 will feed the smart device with XY coordinates as changed from the starting reference point, and the smart device will be giving instructions to the autonomous device as to where to go and what modular functions to activate.

It should be appreciated that the one or more commands are sent at predetermined intervals and are encrypted to be decrypted by a tag and the one or more smart devices will store a location of the one or more smart devices and the tag or tags with one or multiple unique IDs.

It should be appreciated that system 701 is specifically suited to reduce the burden of inventory. For example, in conventional systems, staff must perform or subcontract to capture inventory once or multiple times per year. The system of the present invention automates this by attaching the tracking devices with RFID tags to equipment during the first onsite inventory. Staff would attach tags to new equipment added after the first inventory is performed. The system of the present invention will automate that process without costly real-time locating infrastructure to eliminate the need for manual inventory capture. The staff will launch the inventory capture app on a smart device, and as the staff walk down a corridor, the application will capture the locations of the tracking devices as well as RFID tags that are in rooms to the left and right of their current location. Data transmitted by the tags will be stored in the smart device until it can be transferred to the backend database if not 'live' on a local, enterprise, or cloud-hosted network. Staff, via the Inventory capture application, query for the location of an RFID tag either via the smart device or a second computer. When in close proximity to the RFID tag, the application can command the tag to do various functions: e.g. blink its LED, sound its annunciator/horn, etc The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A locating system, comprising:
    a central server configured to receive and process data;
    a device with a unique identification (ID) configured to be secured or assigned to a person or asset, the device having:
    an radio-frequency identification (RFID) tag with built in encryption and decryption technology, the RFID tag further having one or more data fields that contain one or more information;
    a listening technology that continuously listens for instructions from one or more smart devices; and
    an excitation sensor configured to be activated by an external exciter; one or more commands to be sent to the device and understood via the listening technology;
    the one or more smart devices to send the one or more commands to the device, each of the one or more smart devices having:
    a tracking device having a sensor configured to emit one or more signals that detect a nearby structure within a room, which in turn determines raw distance data between the sensor and the nearby structure within the room, the tracking device is configured to determine a first location and a second location, based on the determined raw distance data, as the device with the unique ID travels a distance from the first location to the second location; wherein the raw distance data is generated based on precise distances between the tracking device and the nearby structure within the room; wherein the nearby structure comprises wall surfaces within the room;
    image recognition technology to recognize one or more location identifiers to determine a location of the one or more smart devices; and
    communication technology to communicate with one or more autonomous transport devices to determine location data;
    wherein the one or more commands are sent at predetermined intervals and are encrypted to be decrypted by the device;
    wherein the one or more smart devices will store a location of the one or more smart devices and the device with the unique ID.

2. The locating system of claim 1, wherein the one or more information includes a battery status and an environmental data, the environmental data being one or more of temperature, pressure, and humidity.

3. The locating system of claim 1, wherein the one or more commands include:
    a first command to send the unique ID;
    a second command to send a battery status;
    a third command to send environmental data;
    a fourth command to send a status or position of an attached digital switch of the device; and
    a fifth command to execute an audio or visual alert.

* * * * *